United States Patent [19]

Bannai

[11] Patent Number: 5,315,322
[45] Date of Patent: May 24, 1994

[54] IMAGE FORMING APPARATUS WITH ANTI-BANDING IMPLEMENTATION

[75] Inventor: Kazunori Bannai, Yokohama, Japan
[73] Assignee: Ricoh Company, Ltd., Tokyo, Japan
[21] Appl. No.: 76,942
[22] Filed: Jun. 16, 1993

Related U.S. Application Data

[63] Continuation of Ser. No. 659,609, Feb. 21, 1991, abandoned.

[30] Foreign Application Priority Data

| Feb. 21, 1990 | [JP] | Japan | 2-38448 |
| Feb. 28, 1990 | [JP] | Japan | 2-45824 |
| Feb. 28, 1990 | [JP] | Japan | 2-45825 |
| Oct. 24, 1990 | [JP] | Japan | 2-284141 |

[51] Int. Cl.$^5$ .................................. G01D 9/42
[52] U.S. Cl. ............................ 346/108; 346/160
[58] Field of Search ............... 346/108, 160; 358/296, 358/300

[56] References Cited

U.S. PATENT DOCUMENTS

| 4,233,612 | 11/1980 | Hirayama et al. | 346/160 |
| 4,404,596 | 9/1983 | Juergensen et al. | 358/293 |
| 4,441,126 | 4/1984 | Greenig et al. | 358/300 X |

FOREIGN PATENT DOCUMENTS

| 63-50809 | 3/1988 | Japan. |
| 64-00974 | 1/1989 | Japan. |
| 2-184463 | 7/1990 | Japan. |
| 2071858 | 1/1981 | United Kingdom. |

*Primary Examiner*—A. T. Grimley
*Assistant Examiner*—Nestor R. Ramirez
*Attorney, Agent, or Firm*—Oblon, Spivak, McClelland, Maier & Neustadt

[57] ABSTRACT

An electrophotographic copier, laser printer, facsimile transceiver or similar image forming apparatus of the type having a rotary polygonal mirror. The apparatus detects a position where a laser beam is incident on a photo-conductive element in both a main scanning direction and a subscanning direction. Based on the detected incident position of the laser beam on the photoconductive element, the laser beam is deflected to produce high quality images free from banding, which can be caused by any one of an irregular configuration of the polygonal mirror, a variation in the moving speed of a photoconductive element, or a variation in the position where a laser beam is incident due to mechanical vibrations.

6 Claims, 17 Drawing Sheets

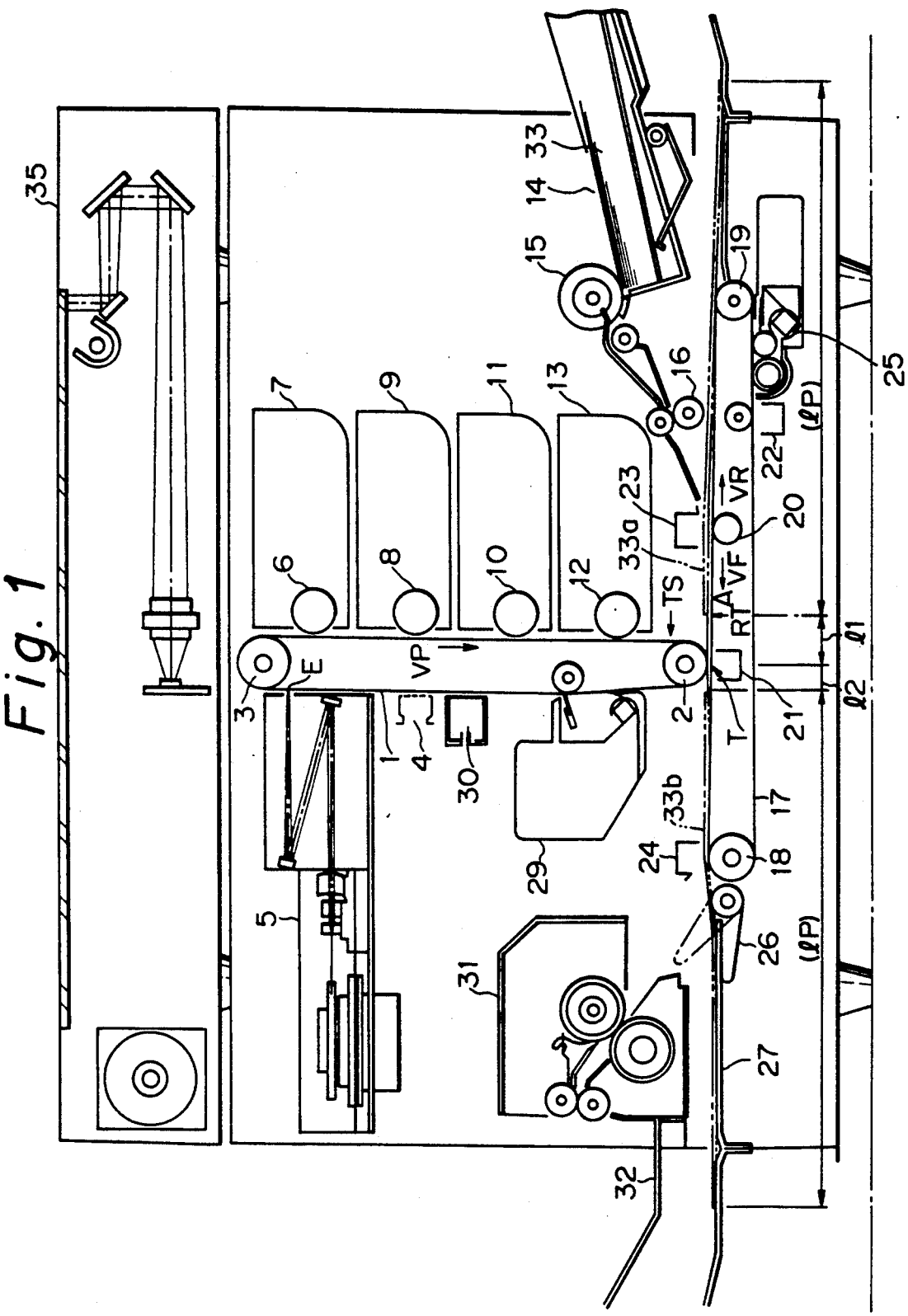

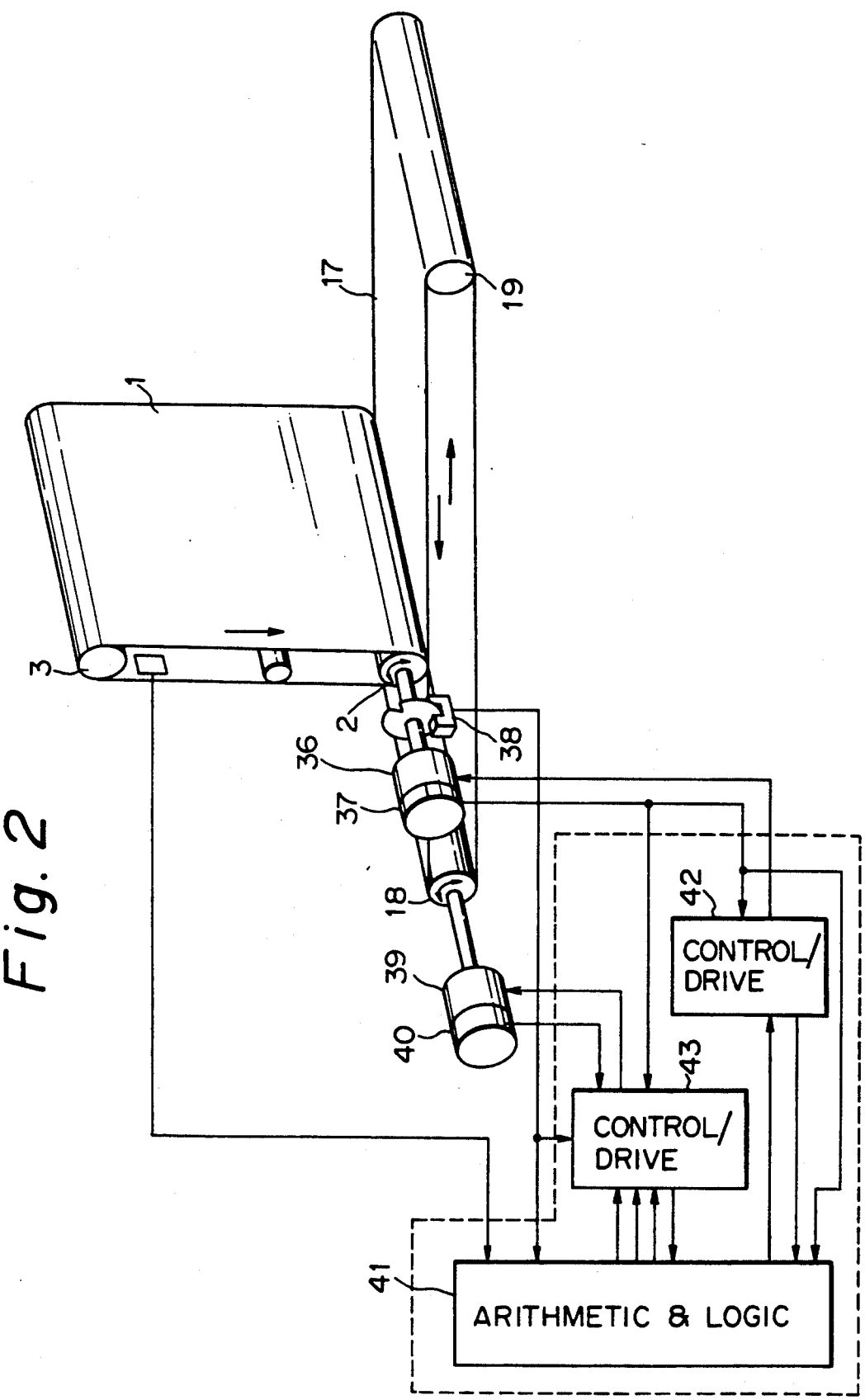

IMAGE FORMING APPARATUS WITH ANTI-BANDING IMPLEMENTATION

This application is a continuation of application Ser. No. 07/659,609, filed on Feb. 21, 1991, now abandoned.

BACKGROUND OF THE INVENTION

The present invention relates to an image forming apparatus and, more particularly, to an electrophotographic copier, laser printer, facsimile transceiver or similar image forming apparatus of the type having a polygonal mirror.

There is an increasing demand for an image forming apparatus capable of forming an image at high density and in multiple tones. In this respect, banding which occurs in the subscanning direction of an image and lowers the image quality is an obstacle. One of major causes of banding is the irregularity in the position where a laser beam is incident to a polygonal mirror. Specifically, when the individual mirror surfaces of a polygonal mirror are different in angle, the position where a laser beam is incident to the mirror differs from one surface to another. Since a developing unit and a fixing unit as well as the polygon mirror are driven by motors and, therefore, necessarily causes mechanical vibrations, the vibrations are transmitted to a laser unit and mirrors to change the position where the laser beam is incident to a photoconductive element, or image carrier, again resulting in banding. Further, when the moving speed of the photoconductive element changes, the subscanning pitch is changed to cause banding to occur in an image. The change in the moving speed of the photoconductive element is ascribable to the irregularity in the rotation speed of a motor which drives the element, the eccentricity of a shaft on which the photoconductive element implemented as a drum is mounted, the eccentricity of a roller for driving the photoconductive element implemented as a belt, the eccentricity of gears and pulleys which constitute gearing, the change in speed due to backlash, etc. In the light of this, it has been customary to drive the photoconductive element by an expensive motor whose rotation speed changes little, accurate gearing, or a flywheel having a great moment of inertia.

Regarding the banding ascribable to the configuration of the polygonal mirror, Japanese Patent Laid-Open Publication No. 91211/1981 proposes an anti-banding system in which a beam is emitted onto a mirror surface of a polygon mirror other than the mirror surface to which a data beam is incident. A signal representative of the inclination angle of the particular mirror surface is generated beforehand in response to a reflection from the mirror surface. When the particular mirror surface arrives at a position where the data beam should be incident, the incidence angle of the data beam to the polygon mirror is controlled on the basis of the above-mentioned signal.

Various approaches for eliminating banding due to the irregular rotation of the photoconductive element are shown and described in Japanese Utility Model Laid-Open Publication No. 193518/1985 and Japanese Patent Laid-Open Publication Nos. 7262/1987, 65275/1986, and 110115/1986l Laid-Open Publication No. 193518/1985 teaches a system which displaces a laser or a collimating lens mechanically by an actuator in a direction parallel to the axis of a polygonal mirror and in synchronism with the rotation of the mirror. Laid-Open Publication No. 7262/1987 discloses a system which senses the angular position of a photoconductive element and, based on the resultant signal, sets an exposure start timing and an exposure end timing of exposing means. Laid-Open No. 65275/1986 proposes an arrangement in which an optical writing device writes a light image on a photoconductive element in synchronism with the transport speed of a photoconductive element. Further, Laid-Open Publication No. 110115/1986 teaches a system which drives, when detected a laser beam deflected by a polygonal mirror, a photoconductive element by a predetermined angle which is dependent on the the intervals of scanning lines.

The problem with Laid-Open Publication No. 91211/1981 is that the structure is complicated and, moreover, the fluctuation in the rotation speed of the photoconductive element is not considered at all. Laid-Open Publication No. 193518/1985 has a drawback that the mechanical displacement relying on an actuator cannot respond to speed ripples rapidly and, therefore, fails to correct high-speed fluctuation. Laid-Open Publication Nos. 7262/1987 and 65275/1986 both are applicable only to an LED array and an LCD array and need complicated circuitry. Laid-Open Publication No. 110115/1986 cannot eliminate the fluctuation in rotation since it implements the control over the rotation of the photoconductive element by drive transmission using a timing belt and gears.

SUMMARY OF THE INVENTION

It is therefore an object of the present invention to provide an image forming apparatus which insures high image quality by eliminating banding.

It is another object of the present invention to provide a generally improved image forming apparatus.

In a preferred embodiment of the present invention, an image forming apparatus for forming an image by deflecting a laser beam having been modulated by an image signal by a rotary polygonal mirror onto a photoconductive element to electrostatically form a latent image and then developing the latent image has a position detecting section for detecting an incident position where the laser beam is incident to the photoconductive element. A distance detecting section detects a distance which the photoconductive element moves in a period of time corresponding to a subscanning pitch interval. A correcting section corrects an error in the subscanning pitch and an error in the incident position by deflecting the laser beam in a subscanning direction.

In another preferred embodiment, a single correcting section corrects an error in the subscanning pitch and an error in the incident position which are ascribable to a variation in speed of the photoconductive element.

In another preferred embodiment, a correcting section corrects banding due to a variation in speed of the photoconductive element by comparing an output signal of the distance detecting section and a set signal stored beforehand and then deflecting the laser beam in a subscanning direction by a correction signal which is a sum of a difference between the output signal and the set signal and a sum of differences as measured from the beginning of writing. The correcting section updates the set signal every time a copy is produced.

In another preferred embodiment, a correcting section corrects banding due to a variation in speed of the photoconductive element by comparing an output signal of the distance detecting section and a set signal stored beforehand and then deflecting the laser beam in a subscanning direction by a correction signal which is a sum of a difference between the output signal and the set signal and a sum of differences as measured from the beginning of writing.

In still another preferred embodiment, a correcting section corrects banding due to a variation in the incident position by comparing an output signal of the position detecting section and a set signal stored beforehand and then deflecting the laser beam in a subscanning direction by a correction signal which is a deviation of the output signal from the set signal.

In a further preferred embodiment, a correcting section corrects banding due to a variation in the incident position by comparing an output signal of the position detecting section and a set signal stored beforehand and then deflecting the laser beam in subscanning direction by a correction signal which is a deviation of the output signal from the set signal.

BRIEF DESCRIPTION OF THE DRAWINGS

The above and other objects, features and advantages of the present invention will become more apparent from the following detailed description taken with the accompanying drawings in which:

FIG. 1 is a section showing a color copier to which the present invention is applicable;

FIG. 2 is a view showing a mechanism for driving a photoconductive belt and a transfer belt included in the color copier of FIG. 1;

DESCRIPTION OF THE PREFERRED EMBODIMENT

Figure 3A:
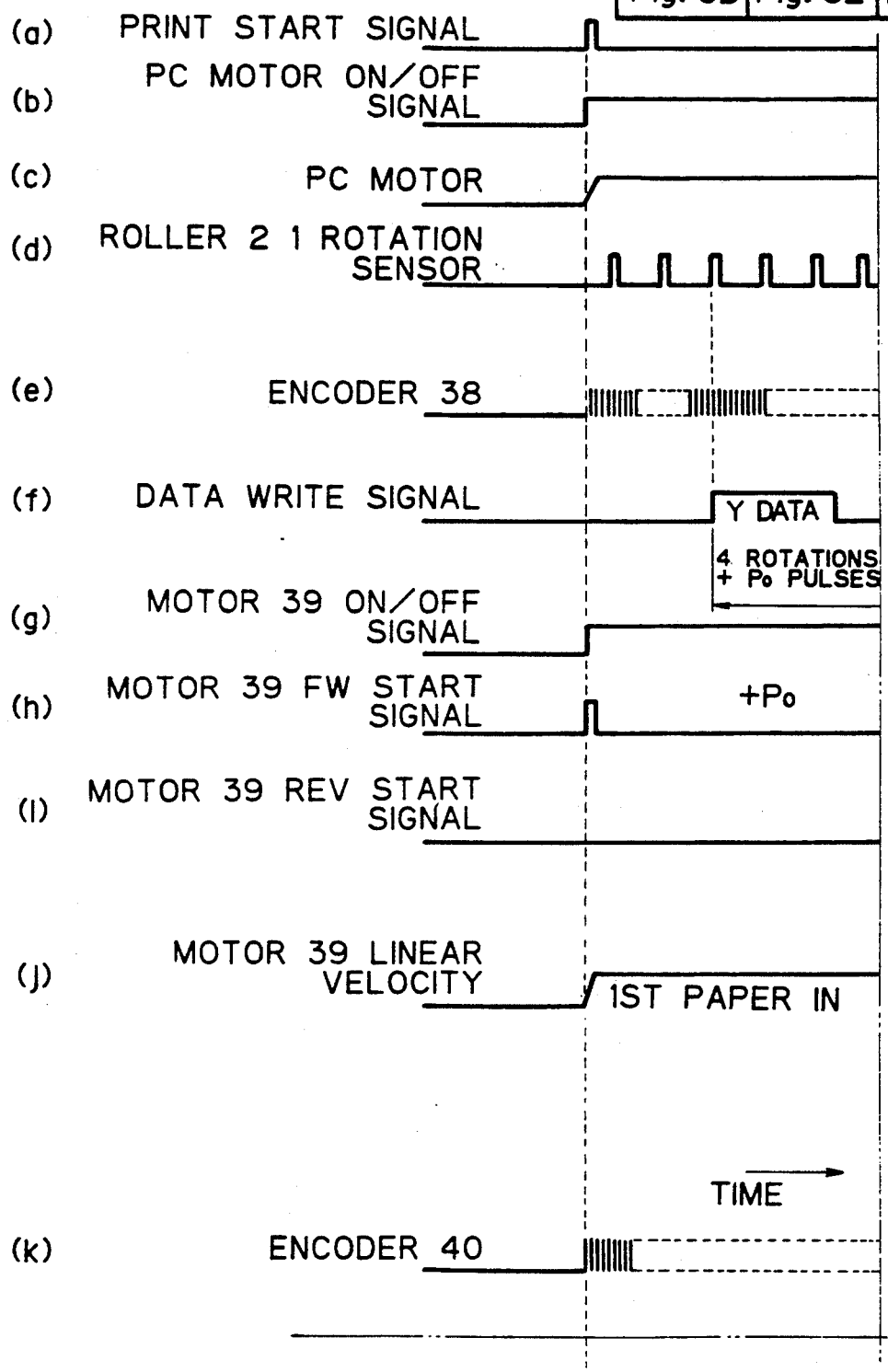
FIG. 3, which is composed of FIGS. 3A, 3B, 3C, 3D, 3E and 3F, is a timing chart representative of a basic operation of the color copier shown in FIG. 1.
Figure 3B:
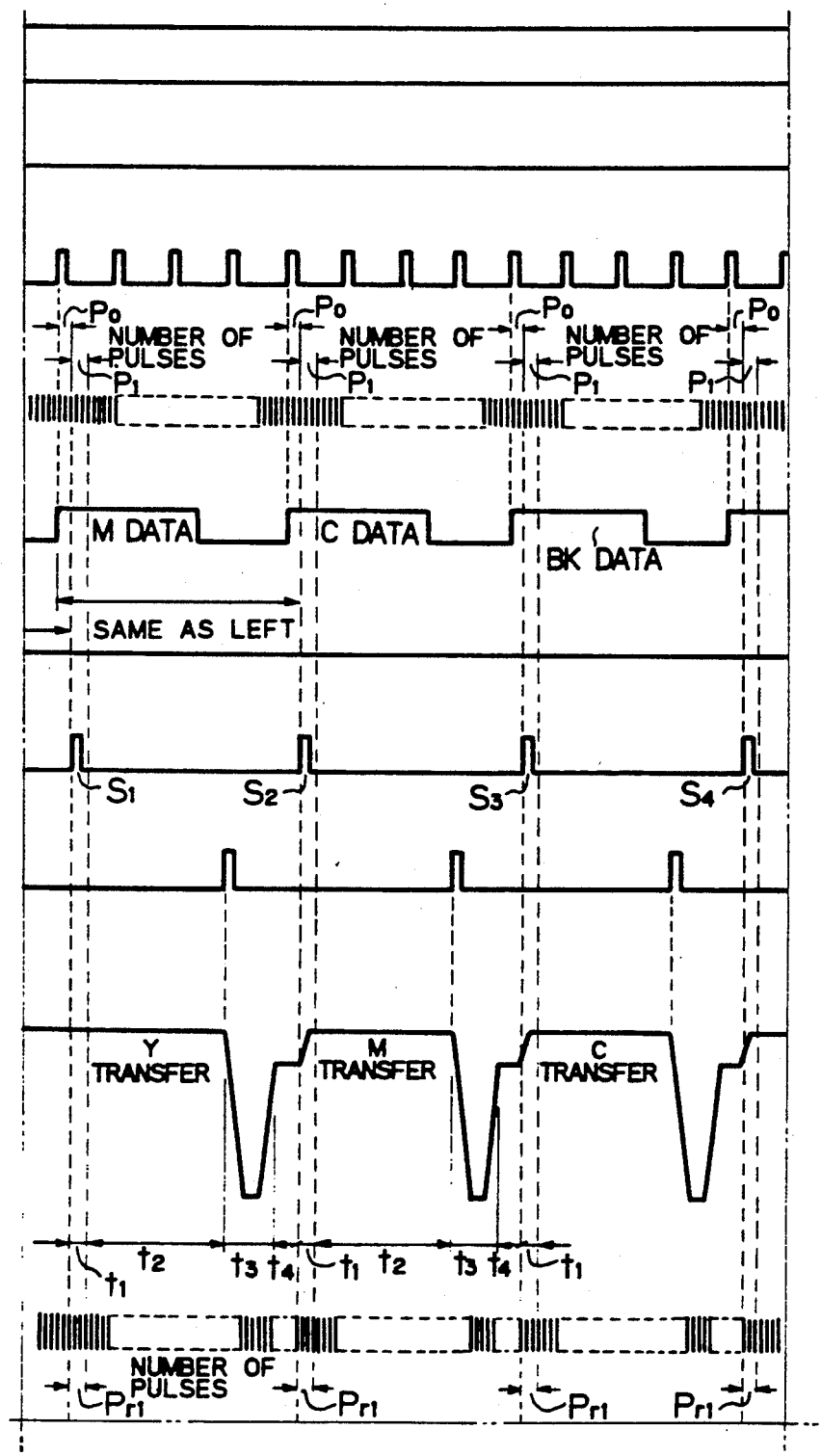
Figure 3C:
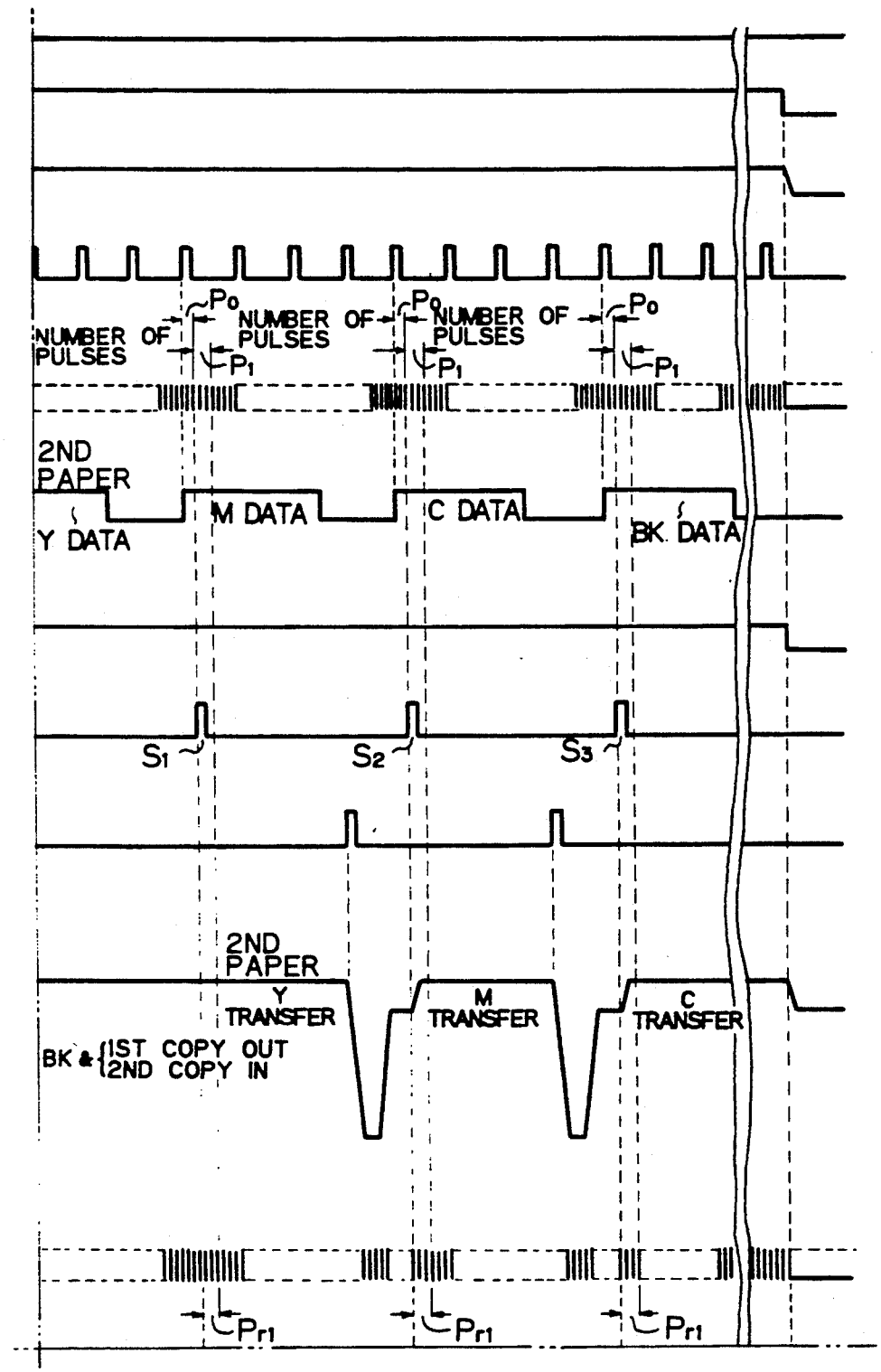
Figure 3D:
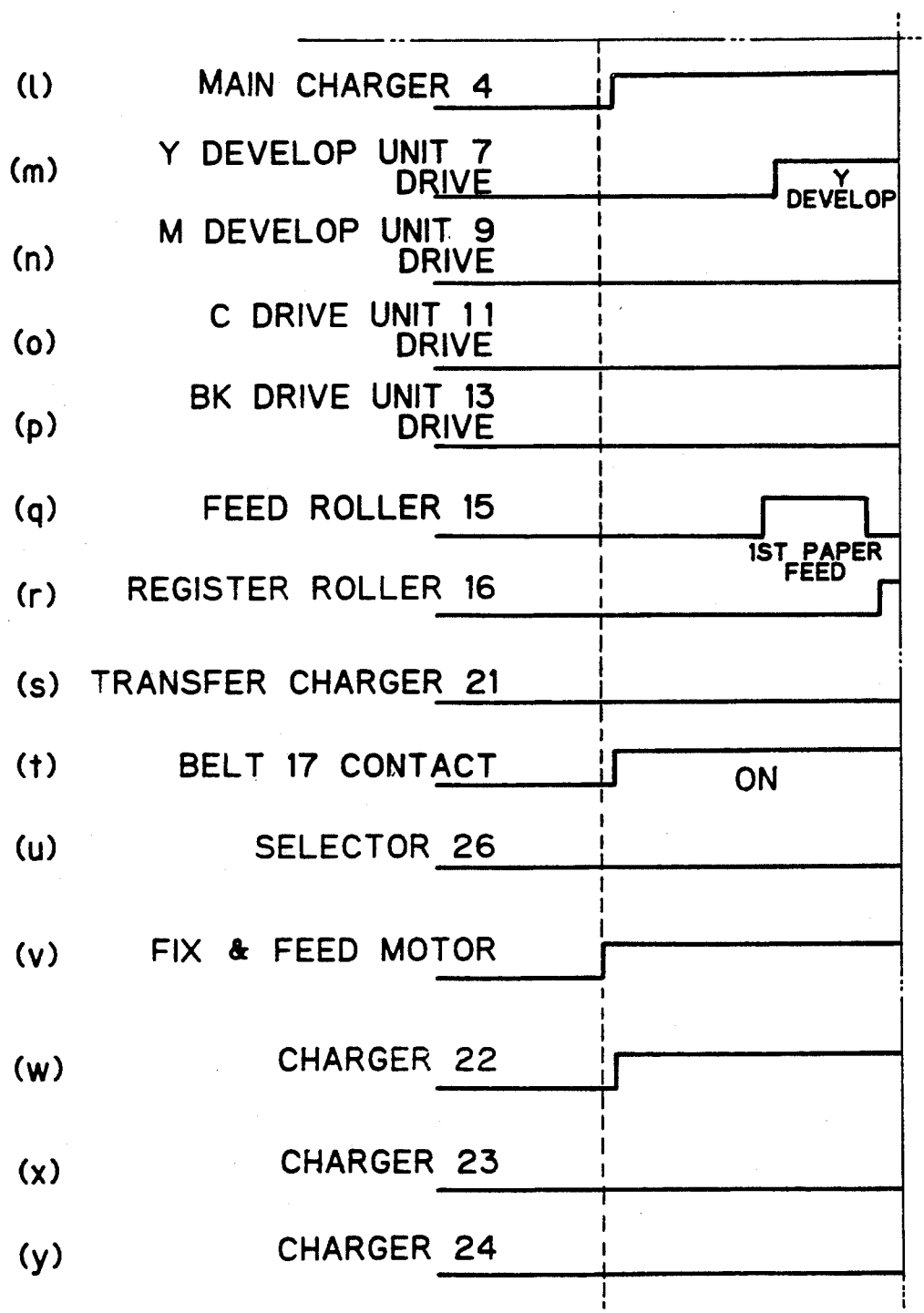
Figure 3E:
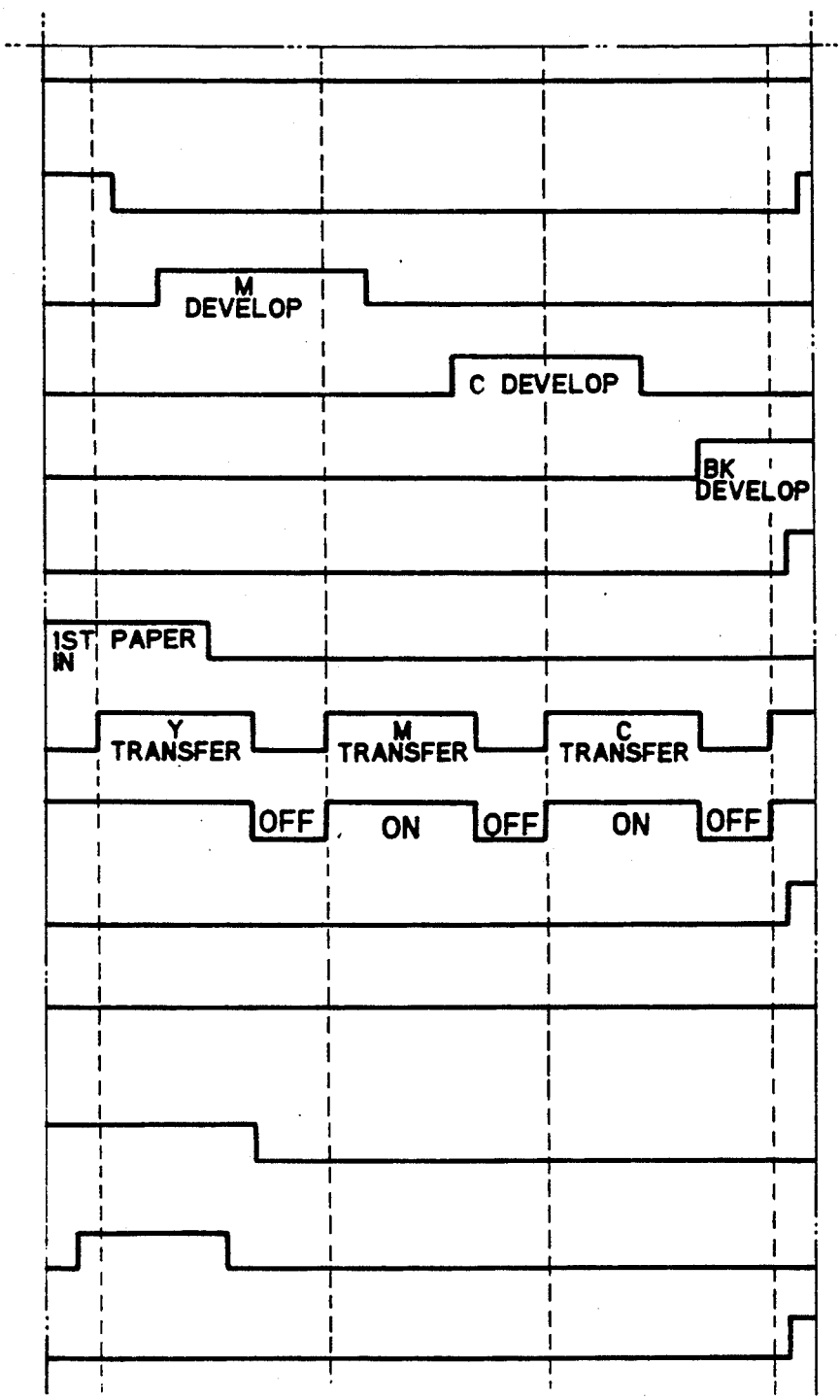
Figure 3F:
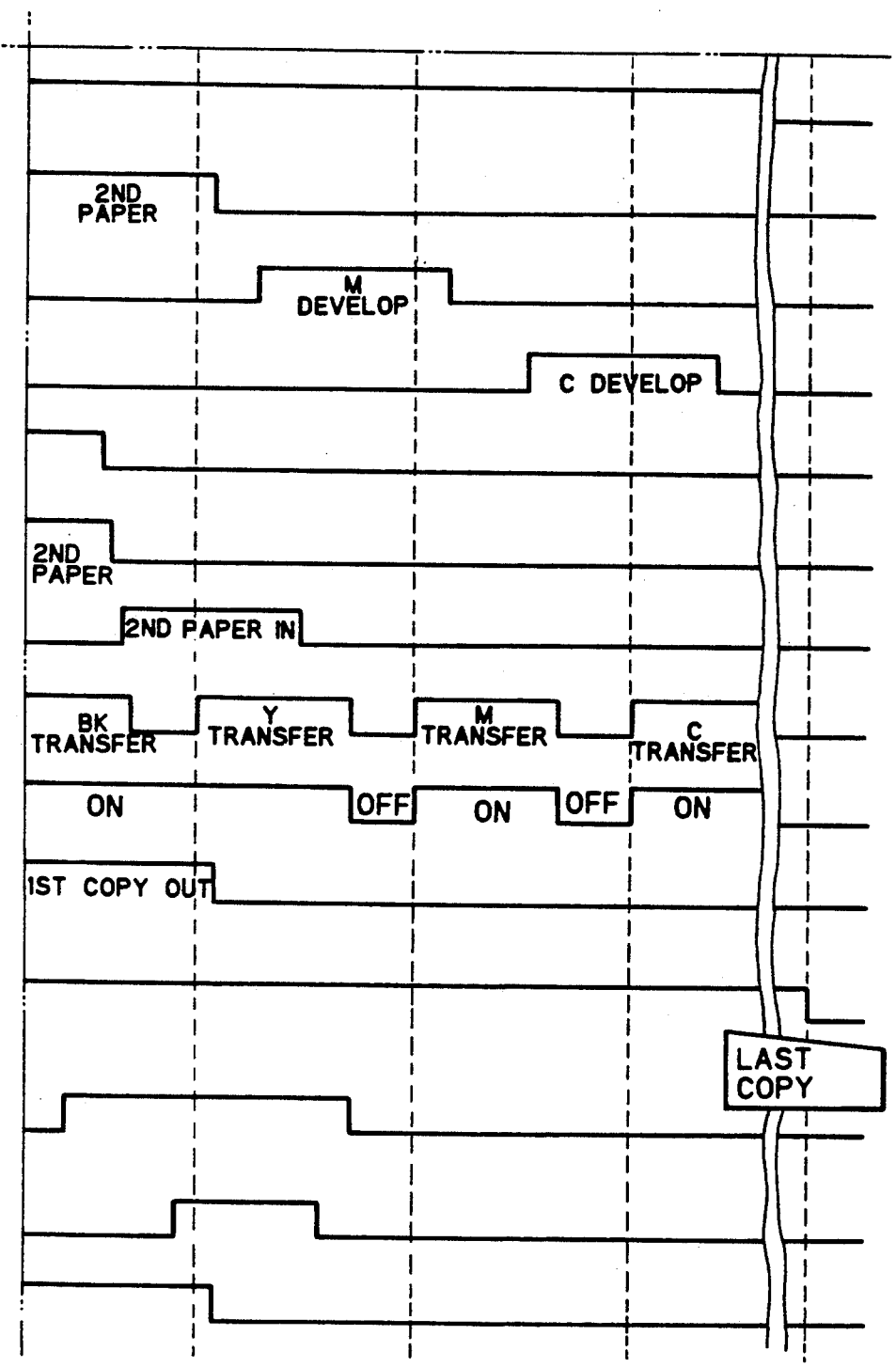

Referring to FIG. 1 of the drawings, a color copier belonging to a family of image forming apparatuses and to which the present invention is applicable is shown. The color copier has a photoconductive element in the form of a belt 1, a drive roller 2, a driven roller 3, an image reader 35, a writing unit 5, a main charger 4, a discharger 30, a cleaning unit 29, a yellow (Y), a magenta (M), a cyan (C) and a black (BK) developing unit 7, 9, 11 and 13, respectively, a transfer belt 17, a transfer charger 21, a drive roller 18 and a driven roller 19.

The transfer belt 17 is passed over the drive roller 18 and driven roller 19. A paper cassette 14 is located in the vicinity of the driven roller 19 and loaded with a stack of paper sheets 33. The paper sheets 33 are fed one by one toward the transfer belt 17 by a feed roller 15 and a register roller 16. A fixing unit 31, a tray 32, a paper guide 27 and a separation charger 24 are disposed in the vicinity of the drive roller 18. The photoconductive belt 1 is passed over the drive roller 2 and driven roller 3 and positioned perpendicularly to the transfer belt 17. The transfer charger 21 faces the drive roller 2 with the intermediary of the transfer belt 17. The Y, M, C and BK developing units 7, 9, 11 and 13 are arranged at one side of the photoconductive belt 1 and have developing rollers 6, 8, 10 and 12, respectively. The writing unit 5, main charger 4, discharger 30 and cleaning unit 29 are located at the other side of the photoconductive belt 1.

FIG. 2 shows a specific mechanism for driving the photoconductive belt 1 and transfer belt 17. As shown, a high-resolution encoder 38 is associated with a shaft which drives the photoconductive belt 1. A motor 36 for driving the belt 1 and an encoder 37 associated therewith are connected to the drive roller 2. The motor 36 is connected to a control/drive circuit 42. The encoder 37 is connected to the control/drive circuit 42 and another control/drive circuit 43. A motor 39 for driving the transfer belt 17 and an encoder 40 associated therewith are connected to the drive roller 18 and to the drive/control circuit 43. The control/drive circuits or servo control boards are connected to an arithmetic and logic circuit or main board 41.

The basic operation of the color copier having the above construction will be described with reference to FIG. 3. When a print switch, not shown, is turned on, the motor 36 drives the drive roller 2 clockwise and thereby moves the photoconductive belt 1 at a linear velocity of VP in a direction indicated by an arrow. At the same time, the motor 39 is rotated in the forward direction to move the transfer belt 17 at a linear velocity of VF in a direction indicated by an arrow A in FIG. 2 (see (g), (h) and (j), FIG. 3). Control conditions are selected such that the linear velocities VP and VF are equal to each other. The photoconductive belt 1 is discharged by the discharger 30 and uniformly charged by the main charger 4 in such a manner as to satisfy the following conditions.

(1) After the cleaning unit 29 has removed toner particles remaining on the photoconductive belt 1, the discharger 30 reduces the surface potential of the belt 1 to substantially zero volt by light or corona discharge.

(2) In a negative-to-positive process, toner particles deposit on non-charged surface portions of the belt 1. Hence, the charger 4 uniformly charges the surface of the belt 1.

(3) When the main charger 4 charges the belt 1 by corona discharge for the above-stated purpose, the corona discharge generates ozone. Although ozone decomposes soon after the stop of discharge, it is apt to adversely afgect the surface of the belt 1 and to thereby prevent a clear-cut image from being produced. In the light of this, air is blown or sucked at the rear of the charger 4 by a fan.

The encoder 38 mounted on the shaft of the drive roller 2 outputs a pulse every time the roller 2 is rotated ((d), FIG. 3). In response to the third pulse, a semiconductor laser (LD) included in the writing unit 5 is controlled to start writing Y image data in the photoconductive belt 1, whereby a latent image is formed on the belt 1. Regarding the image data, the image reader 35 reads, for example, blue, green and red separated color components and, based on the optical intensity levels of the individual color components, develops Y, M, C and BK image data. If desired, use may be made of image data outputted by any other suitable color image processing system such as a color facsimile machine, word processor, or personal computer. This can be done if an exclusive interface is used.

The developing units 7, 9, 11 and 13 are usually positioned such that their developing rollers 6, 8, 10 and 12 do no contact the surface of the photoconductive belt 1. When a portion of the belt 1 carrying a latent image representative of a particular color component is about to reach the developing roller of one of the developing units which is expected to develop the latent image is urged to the left as viewed in FIG. 1. As a result, the developing roller is caused into contact with the belt 1 by a predetermined amount. At the same time, the developing roller and other sections contributing to the development are driven (see (m) to (p), FIG. 4). The developing unit of interest is moved away from the belt 1 just after the above-mentioned portion of the belt has moved away from the developing roller.

Specifically, a latent image representative of a Y component is formed on the photoconductive belt 1 first. Hence, the Y developing unit 7 is caused into contact with the belt 1 and then driven in synchronism with the Y image, thereby producing a Y toner image (see (m), FIG. 3). This is follows by an image transferring step. As shown in FIG. 1, the transfer belt 17 is moved up and down by a roller 20 into and out of contact with the photoconductive belt 1 at an image transfer position where the drive roller 2 is located. On the start of a printing operation, the transfer belt 17 is driven in the direction A, FIG. 2, and then the roller 20 is raised to bring the belt 17 into contact with the belt 1 ((t), FIG. 3). A paper sheet 33 is fed at a predetermined timing by the feed roller 15 and then by the register roller 16 such that it coincides with the toner image formed on the belt 1. At this instant, a charger 23 effects corona charge of predetermined polarity ((x), FIG. 3) to cause the paper sheet 33 into close contact with the belt 17, thereby preventing the paper sheet 33 from being dislocated during the image transfer. The roller 20 for moving the belt 17 up and down plays the role of a counter electrode coactive with the charger 23 so as to simplify the construction. Before the transfer of the first color component, the discharger 22 uniformly discharges the entire surface of the belt 17 ((w), FIG. 3). At the same time, a cleaning unit 25 cleans the belt 17.

When the Y toner image formed on the photoconductive belt 1 reaches a position TS short of the transfer position T by a predetermined distance, a forward start signal S1 ((h), FIG. 3) is fed to the control/drive circuit 43 associated with the motor 39 in order to drive the motor 39 forward. Because the motor 39 has already been rotated when the signal S1 is inputted, the forward rotation is continued ((j), FIG. 3). Specifically, the signal S1 is generated substantially at the time when the leading edge of the paper sheet 33 arrives at a position short of the transfer position T by a distance l1 and the leading edge of the Y image on the belt 1 arrives at the position TS which is also short of the position T by a distance l1. In FIG. 3, when the signal S1 is generated as mentioned above, the drive roller 2 for the belt 1 has rotated four rotations and rotations corresponding to Po output pulses of the encoder 37, as measured from the start of writing of the Y image data ((d), (e), (f) and (h), FIG. 3). During this period of time, the belt 1 moves over a distance corresponding to the distance between the positions E and TS. At a time t1 as counted from the time when the signal S1 has been inputted, the leading edges of the Y image and paper sheet 33 both have moved the distance l1 to the transfer position T. Thereafter, the transfer charger 21 transfers the Y image to the paper sheet 33. At the time t1, the encoders 37 and 40 have produced P1 pulses and PT1 pulses, respectively ((e) and (k), FIG. 3). Regarding the resolution of the encoders 37 and 40, if the distances which the associated belts move per pulse are the same, P1 and PT1 are equal; if the ratio of the distances is $\alpha$, then P1 and PT1 each has a particular value dependent on the coefficient $\alpha$. The following description will concentrate on $P_1 = PT_1$ by way of example.

As the transfer of the Y image proceeds, the leading edge of the paper sheet 33 is separated from the transfer belt 17 and steered by a path selector 26, which is held in a position indicated by a solid line in FIG. 1, toward the guide 27. As soon as the trailing edge of the paper sheet 33 moves away from the transfer position T by a distance l2, i.e., at the time (t1+t2) when the paper sheet 3 has moved by a distance [l1+lP (paper size)+l2] after the input of the signal S1, a reverse signal is generated to reverse the motor 39 ((i) and (j), FIG. 3). At this time, the paper sheet 33 assumes a position indicated by a dash-and-dots line 33b in FIG. 1. Before the reversal of the motor 39, the roller 20 is lowered to move the transfer belt 17 away from the photoconductive belt 1. The reversal of the motor 39 causes the belt 17 and paper sheet 33 to return quickly at a speed of VR (>VF) to the right as viewed in FIG. 1. Specifically, the belt 17 and paper sheet 33 are returned to the right in a short period of time t3 over the distance which they were moved to the left in the period of time t1+t2. At this instant, the trailing edge of the paper sheet 33 is separated from the belt 17 and moved toward a rear guide 28. When the paper sheet 33 has been accurately returned by the predetermined distance, it is brought to a stop at a dash-and-dots line position 33a where the leading edge thereof is located at the position RT. In such a stop position, the paper sheet 3 waits for the transfer of the second or M image (time t4).

While the transfer of the first or Y image is under way, the second or M image is formed on the photoconductive belt 1. Specifically, when the drive roller 2 has rotated an integral number of rotations, i.e., four rotations in FIG. 3 after the start of Y image writing, a procedure for forming a latent image representative of M image data begins. The Y developing unit 7 is held in contact only with the Y image portion of the belt 1 and, before the M image portion arrives, it is moved away from the belt 1 and then deactivated. Instead, the M developing unit 8 is caused into contact with the belt 1 before the leading edge of the M image portion reaches it ((n), FIG. 3), thereby developing the latent image representative of the M image. Assume that the leading edge of the M image has arrived at the position TS, i.e., the belt 1 has been moved over a distance corresponding to four rotations of the drive roller 2 and Po output pulses of the encoder 37 after the start of M image writing. Then, a forward start signal S2 meant for the motor 39 is applied to the control/drive circuit 43. At the same time or slightly later than the generation of the signal S2, the roller 20 begins to raise the belt 17 such that the belt 17 contacts the belt 1 at least before the leading edge of the paper sheet 33 reaches the position T.

On the lapse of the time t1 as counted from the generation of the signal S2, the photoconductive belt 1 has moved the distance $l_1$ corresponding to $P_1$ output pulses of the associated encoder 37, as in the case of Y image. Hence, position control is effected such that the paper sheet 33 is also accelerated from zero speed to the speed VF (=VP) in the time t1 and such that, during this period of time, the same number of pulses PT1 as the pulses appeared during the time $t_1$ after the generation of the first forward start signal $S_1$ appear, i.e., $P_1=PT$. Then, the leading edge of the paper sheet 33 is again moved by the distance l1 in the time t1 with the result that the M image is brought into register with the Y image on the belt 1.

The procedure described above is followed by the transfer of the M image, the quick return of the paper sheet 33, the writing of C image data, C development, the transfer of a C image, the quick return of the paper sheet 33, the writing of BK image data, C development, and the transfer of a BK image.

A sequence of steps which follows the transfer of a BK image will be described. At the time for transferring a BK image, the path selector 26 is moved to a position indicated by a dash-and-dots line in FIG. 1. As a result, the paper sheet 33 undergoing the image transfer advances toward the fixing unit 31 while being discharged by the separation charger 24. Even after the trailing edge of the paper sheet 3 has undergone the image transfer, the motor 39 is continuously driven in the forward direction to transport the paper sheet 33 to the left. The paper sheet, or color print, coming out of the fixing unit 31 is driven out onto the tray 32 ((j), (u), (v) and (y), FIG. 3). When the trailing edge of the portion of the transfer belt 17 associated with the first paper sheet passes the discharger 22, the discharger 22 begins to uniformly discharge the belt 17 by corona discharge ((w), FIG. 3).

As shown in FIG. 3, when the copier is operated in a repeat mode, the Y image data is written again after the writing of the BK image data while the transfer belt 17 and paper sheet 33 are controllably driven in the previously stated manner. After the image transfer, the photoconductive belt 1 is cleaned by the cleaning unit 29, discharged by the discharger 30, and then moved toward the main charger 4. Finally, the last color print is transported to the tray 32, and the belts 1 and 17 each is discharged and then brought to a stop.

While the foregoing description has concentrated on a specific image forming order of Y, M, C and BK and a specific arrangement of Y, M, C and BK developing units as named in the vertical direction, they are only illustrative and not restrictive. Although the color copier shown and described forms a latent image by writing digitally processed color image data by a laser, an analog light image customary with an ordinary electrophotographic copier may be focused at the point E by predetermined timing and position control.

When only two or three of the four different colors Y, M, C and BK are to be superposed to produce a color recording, the operations of the various sections will be so controlled as to form images of desired colors and transfer them two or three consecutive times. In the case of monocolor recording, one of the developing units associated with a desired color and the belt 17 will be held in contact with the belt 1 until a desired number of prints are produced. During such a monocolor mode operation, the path selector 26 is positioned such that the paper sheet 33 is guided toward the fixing unit 31.

Hence, in the repeat mode, the printing speed is 4/3 times, twice and four times higher in three-color recording, two-color recording and monocolor recording, respectively, than in four-color recording. Regarding the developing colors, the four colors described above may be replaced with any other desired colors such as blue, green and red.

Figure 4:
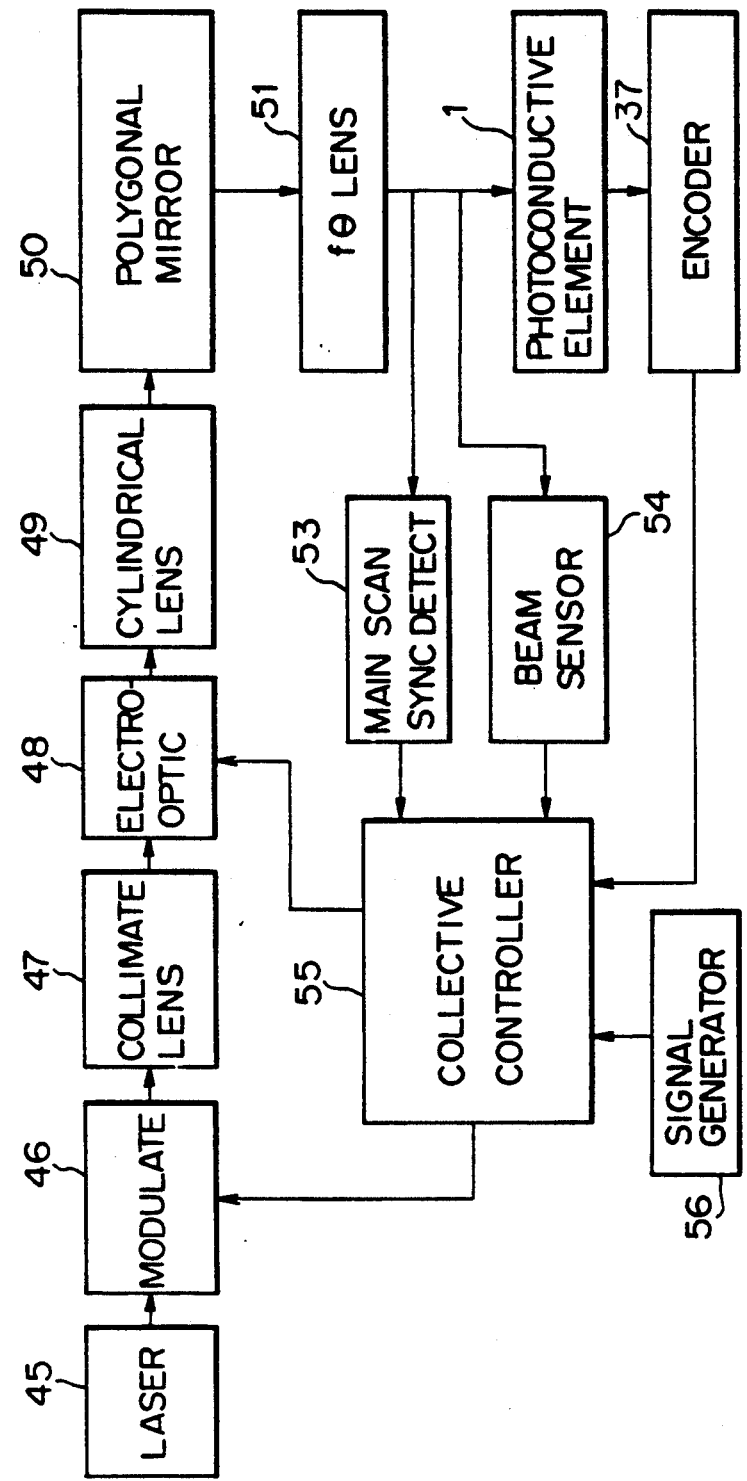
FIG. 4 is a block diagram schematically showing a control system included in an image forming apparatus embodying the present invention.
Figure 5:
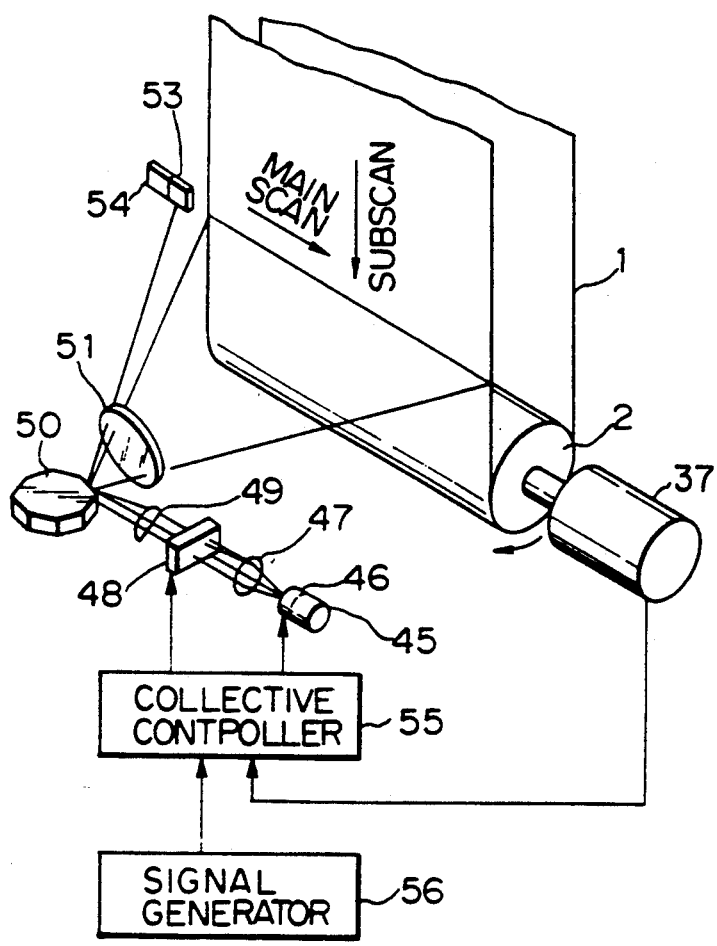
FIG. 5 is a perspective view of the embodiment.

Referring to FIGS. 4 to 12, an image forming apparatus embodying the present invention and applicable to the above-described color copier will be described. As shown in FIGS. 4 and 5, the apparatus includes a semiconductor laser 45, a modulating section 46, and a collimating lens for collimating a laser beam 45 issuing from the laser 45. An electrooptic device 48 plays the role of correcting means for correcting the collimated beam in the subscanning direction. A cylindrical lens 49 restricts the beam in the subscanning direction. A polygonal mirror 50 is rotated at a constant speed by a servo motor or similar drive source. A scanning f-theta lens system 51 corrects the scanning speed of the laser beam, corrects the irregularity in the incident position of the laser beam to the polygonal mirror 50. A photoconductive element 1 is driven by given drive means. The rotary encoder 37, also shown in FIG. 2, serves as distance detecting means responsive to the rotations of the shaft of the photoconductive element 1, i.e., the distance which the element 1 moves. A synchronization detecting plate 53 is fixed in place in close proximity to a non-image portion of the photoconductive element 1 and detects the synchronization of main scanning. Position detecting means in the form of a beam sensor 54 detects the writing position of the laser beam in the subscanning direction. The reference numerals 55 and 56 designate a collective controller 55 and a signal generator 56, respectively. While the illustrative embodiment implements the beam sensor 54 by Blue Cell or similar photosensor with a knife edge, it may be replaced with a CCD line sensor. In FIG. 5, the electrooptic device 48 is interposed between the collimating lens 47 and the cylindrical lens 49. This is successful in deflecting the collimated beam and, therefore, in reducing the aberration without disturbing the wave front of the beam. The beam sensor 54 may be mounted on a support member which supports the photoconductive element 1 so as to measure the variation in the writing position of the laser beam. This will enhance accurate correction.

In FIG. 4, the outputs of the synchronization detecting plate 53 and encoder 52 are connected to the collective controller 55. The encoder 52 is mounted on the drive roller 2 which drives the photoconductive belt 1 and generates pulses at the intervals of main scanning synchronizing signals. The collective controller 55 compares the number of pulses fed thereto from the encoder 52 with a mean pulse number associated with a set scanning pitch, determines a deviation of the distance which the photoconductive element 1 has moved on the basis of the result of comparison, and then converts the deviation into a voltage for correction. The output of the beam sensor 54 representative of the instantaneous writing position in the subscanning direction is also applied to the collective controller 55. In response, the controller 55 compares it with set position data and then transforms a deviation of the beam position into a voltage for correction. The two voltages for correction are applied to the electrooptical device, or subscanning deflector, 48. As a result, the laser beam is modulated by image data with the subscanning pitch being corrected by the electrooptical device 48. The laser beam is deflected by the polygonal mirror 50 which is rotated at a constant speed, whereby a latent image is formed on the photoconductive element 1. This correction occurs just after the laser beam has reached the beam sensor 54.

Figure 6:
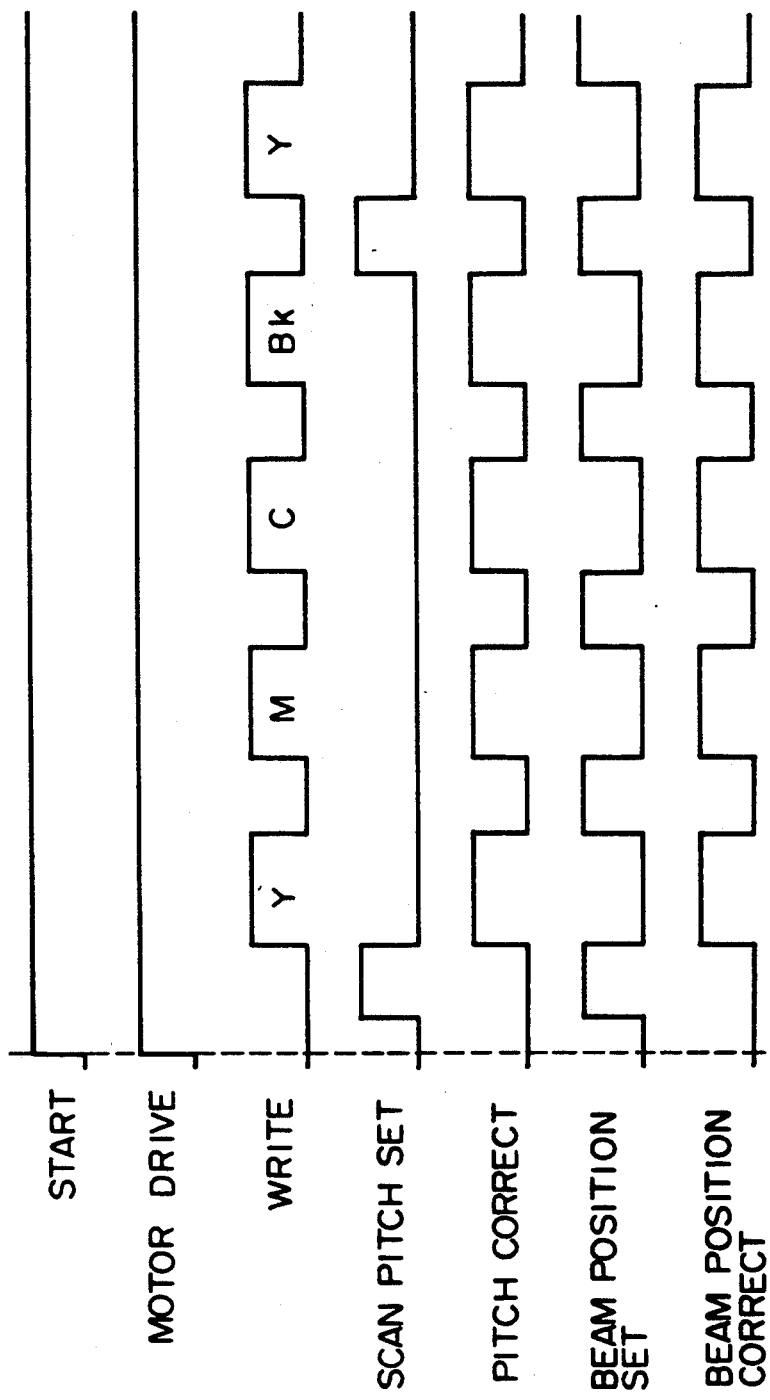
FIG. 6 is a timing chart indicative of a specific operation of the embodiment.
Figure 7:
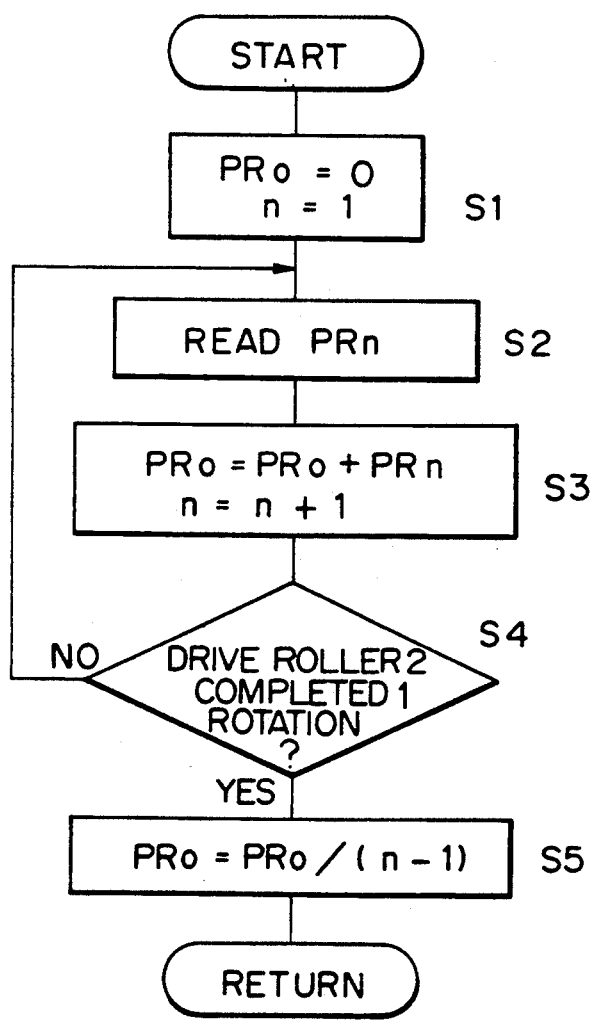
FIGS. 7 and 8 are flowcharts demonstrating specific procedures for eliminating banding which is ascribable to the fluctuation in the rotation speed of a photoconductive element.

A procedure for correcting banding ascribable to the variation in the moving speed of the photoconductive element is as follows. Basically, as shown in FIG. 6, the photoconductive element drive motor 36, FIG. 2, and a motor for driving the polygonal mirror 50 are energized when a start key, not shown, is pressed. As soon as these motors each is accelerated to a predetermined speed, a scanning pitch setting sequence shown in FIG. 7 is executed. As shown in FIG. 7, the pulses having been generated by the encoder 52 associated with the drive roller 2 during the intervals of the main scanning synchronizing signal are added, and the sum is divided by the number of times of detection. When the total number of pulses is selected to be the number of pulses corresponding to more than one rotation of the drive roller 2 (or the shaft of a photoconductive element), there can be reduced an error ascribable to the eccentricity of the drive roller 2 which is presumably the greatest cause of speed fluctuation. This allows the number of pulses associated with a set scanning line pitch to be determined with accuracy. Hence, the value of the beam position corrected against speed change is prevented from being offset to one side, whereby the beam diameter and the aberration of optics change little. Regarding a photoconductive element in the form of a drum, such setting may be effected only when the power source is turned on, since executing the measurement copy by copy would slow down the copying operation. If desired, the procedure described above may be implemented approximately by less than one rotation of the drum, although the dot shape will change.

Specifically, in FIG. 7, pulses (PRo) appearing at the set scanning line pitch are sequentially added (steps S1 to S3). After the drive roller 2 has completed one rotation (Y, S4), the sum is divided by the number of times of detection (S5) to set a scanning line pitch. The number of pulses (PRo) associated with the set scanning line pitch is not changed until a single print has been completed, so that image components may be caused into accurate register.

Figure 8:
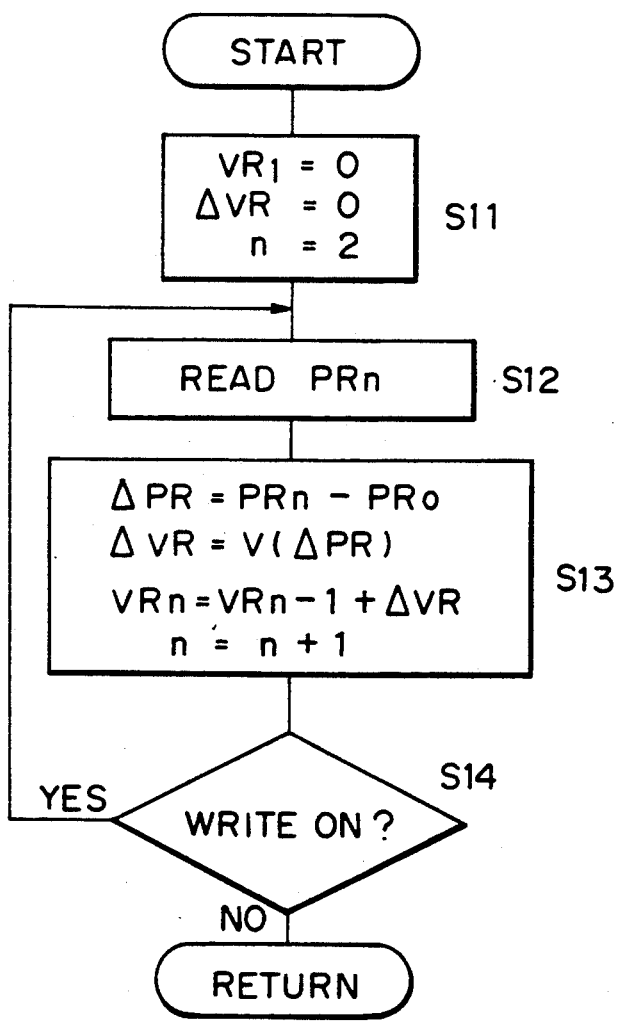

A scanning pitch correction timing occurs as the same time as the image data writing timing. As shown in FIG. 8, a scanning pitch correction flow begins with a step S11 for initializing the drive voltage of the electrooptic device 48. Then, the number of pulses (PRn) associated with the set scanning pitch (PRn) is read (S12). The number of pulses (PRn) generated by the encoder 52 during the interval of main scanning synchronizing signal is compared with the number of pulses (PRo) of the set scanning line pitch. The resulted deviation is converted into a drive voltage ($\Delta$VR) for driving the electrooptical device 48. This drive voltage is added to the voltage representative of the total deviation having occurred, and then the subscanning direction is corrected by the sum voltage (S13 and S14). This is because since the displacement of the photoconductive element 1 at a given moment is an integrated value of the initial and successive speeds, the displacement measured this time has to be added to the total deviation produced by subtracting the displacement associated with the mean speed of the photoconductive element from the displacement having occurred up to the immediately preceding line.

By the procedure described above, it is possible to form an image free from banding which is ascribable to the fluctuation in the speed of the photoconductive element 1.

In the illustrative embodiment, the drive roller 2 has a diameter of 27 millimeters, the rotary encoder 9 outputs 5000 pulses per rotation, and the control is effected with a resolution of about 17 microns. If desired, one pulse may be divided in frequency to increase the resolution.

Figure 9:
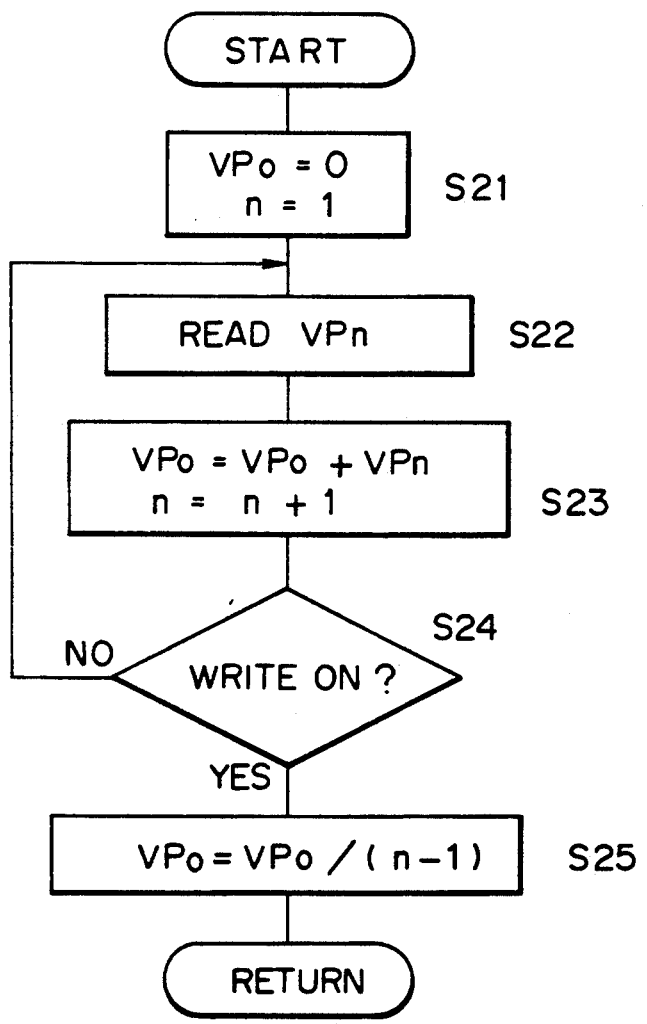
FIGS. 9 and 10 are flowcharts showing specific anti-banding procedures associated with the change in the position of a laser beam.

Banding due to the variation in the incident position of the laser beam is corrected as follows. Basically, as shown in FIG. 6, the photoconductive element drive motor 36 and polygonal mirror drive motor begin to rotate on the turn-on of the start key, and then a position data setting procedure is executed. Specifically, as shown in FIG. 9, this procedure begins with a step S21 for initializing set data. While a voltage for correction is not applied to the electrooptic device 48, line-by-line output voltages (VPn) of the beam sensor 54 are sequentially added until the write signal goes high (S22 to S24). When the write signal goes high (Y, S4), the sum is divided by the number of times of detection to set a voltage (VPo) associated with a beam incident position. When banding is chiefly ascribable to the configuration of the polygonal mirror, the number of times of addition which is an integral multiple of the number of mirror surfaces of the polygonal mirror may be selected to obtain an accurate mean value. The set voltage associated with the mean beam incident position is not changed while data representative of one color component is written.

Figure 10:
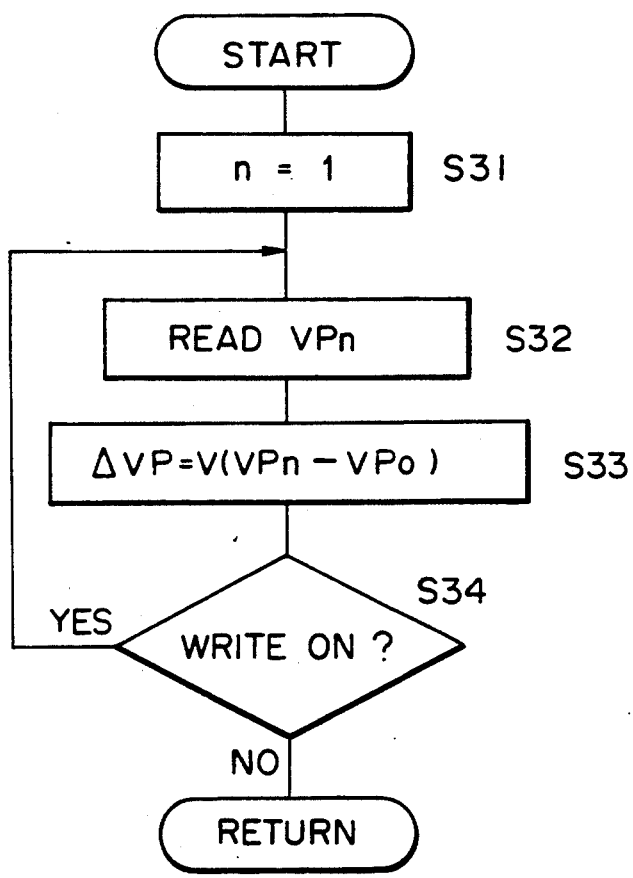

A write position correction timing occurs simultaneously with the image data writing timing. As shown in FIG. 10, in a write position correction flow, the output voltage (VPn) of the beam sensor 54 is read (S31 and S32) and compared with a set voltage (VPo) until the write signal goes low (S33 and S34). The deviation is converted into a drive voltage ($\Delta$VP) for driving the electrooptic device 48 so as to correct the change in the beam position. The resultant image is free from banding ascribable to the change in the beam position.

Figure 11A:
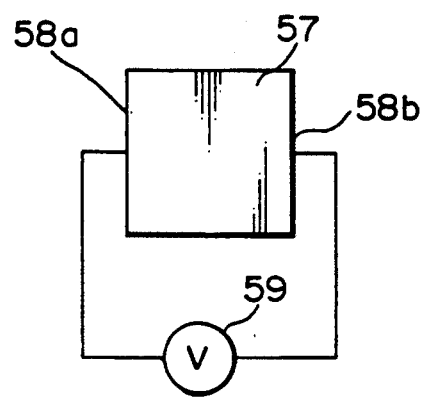
FIGS. 11A and 11B are views representative of an electrooptic device.
Figure 11B:
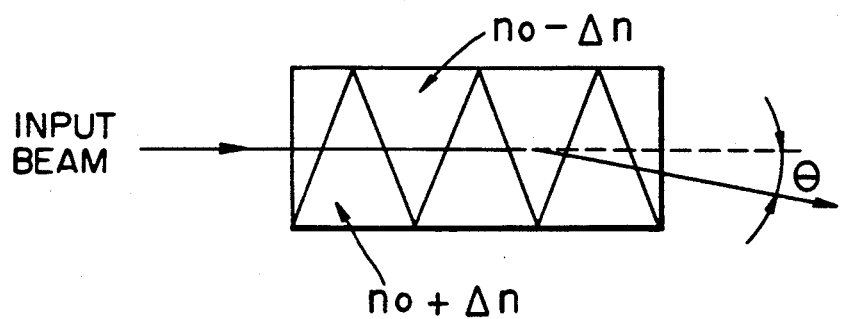

FIGS. 11A and 11B show the electrooptic device 48 specifically. In FIG. 11A, there are shown a KDP (KH$_2$PO$_4$) prism 57, electrodes 58a and 58b, and a power source 59. The refractive index of the KDP prism 57 changes with the voltage of the power source 59. As shown in FIG. 11B, assume that the incident light has a deflection angle $\theta$, the electrooptical device 48 is spaced apart from the exposing surface by a distance L, and the subscanning pitch error is $\Delta$P. Then, the error $\Delta$P will be corrected if the incident light is deflected in such a manner as to satisfy the following condition:

$$\theta = \frac{\Delta P}{L}$$

Figure 12:
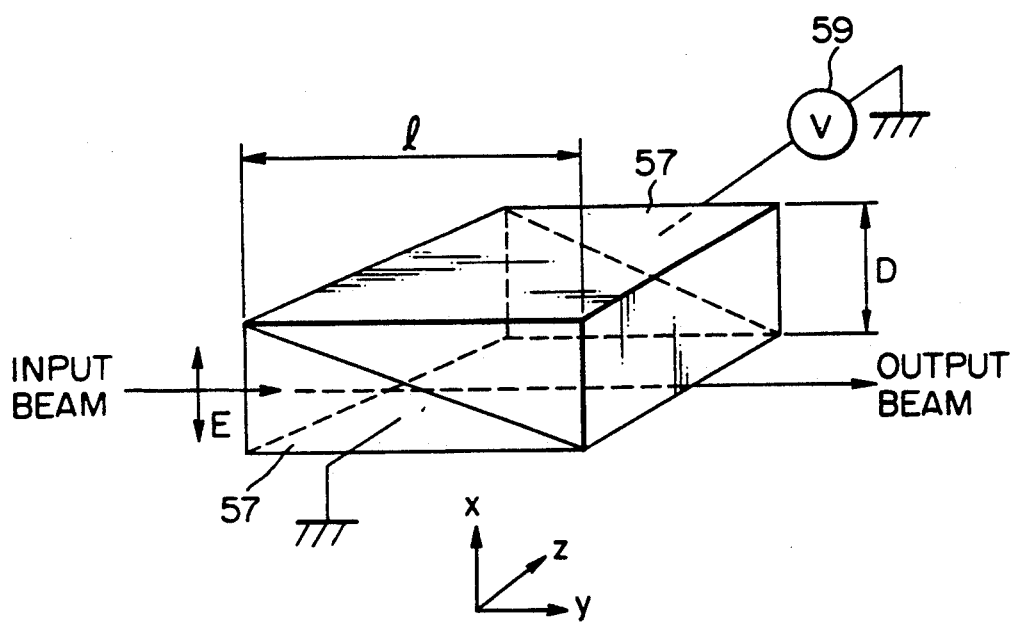
FIG. 12 indicates deflection effected by the electrooptic device.

The deflection by the electrooptic device 48 will be described more specifically with reference to FIG. 12 which shows a pair of KDP prisms 57. The two KDP prisms 57 are positioned such that the positive directions of their crystallographic z axis are opposite to each other. An electric field is applied in the z direction, light is propagated along the y axis, and deflection occurs in the direction of x axis. Assuming that when an electric field Ez is applied to the prisms 57, the upper prism 57 has a refractive index:

$$n_A = n_o - \frac{n_o^3}{2} rEz$$

then, the refractive index of the lower prism 57 is expressed as:

$$n_E = n_o + \frac{n_o^3}{2} rEz$$

where r is an electrooptic coefficient and $r = 10.6 \times 10^{-12}$ m/V. The refractive index $n_o$ is 1.5.

The deflection angle $\theta$ of an incident light beam which is parallel to the y axis is given by Snell's law, as follows:

$$\theta = -\frac{l}{D} n_o^3 rEz$$

When a plurality of pairs of prisms exist as shown in FIG. 11B, the deflection angle is produced by:

$$\theta_n = n \cdot \theta$$

In summary, the present invention directly detects banding and feeds it back and, therefore, realizes high quality laser beam scanning and images which are free from banding. Since the correction of subscanning pitch error and the correction of beam position error ascribable to the variation in the moving speed of a photoconductive element are corrected by single correcting means, the construction is simple and compact. In a writing section, the subscanning pitch error and the beam position error are corrected together, again resulting in a simple and compact construction.

Means for sensing the position where a laser beam is incident is located upstream of an image data writing position. This allows errors to be detected in a position close to an image area and thereby promotes accurate correction. Since a memorized set signal is updated copy by copy, high quality images are insured despite aging.

to correct banding due to the fluctuation in the speed of a photoconductive element, the output of means for detecting the displacement of the element is compared with a set signal stored in a memory, and the resulting deviation is added to the sum of deviations as measured from the beginning of writing. This is successful in enhancing accurate correction and, therefore, in offering high quality images.

A memorized set signal is updated color by color in order to produce stable images at all times with no regard to aging.

Furthermore, to correct banding ascribable to the fluctuation in the beam incident position, the output of means for sensing the incident position of a laser beam is compared with a set signal stored in a memory, and the resulted deviation is used for the corection. This is also successful in enhancing accurate correction and, therefore, producing high quality images.

Various modifications will become possible for those skilled in the art after receiving the teachings of the present disclosure without departing from the scope thereof.

What is claimed is:

1. An image forming apparatus for forming an image by deflecting a laser beam having been modulated by an image signal by a rotary polygonal mirror onto a photoconductive element to electrostatically form a latent image and then developing said latent image, said apparatus comprising:

position detecting means for detecting an incident position where the laser beam is incident to the photoconductive element in both a main scanning direction and a subscanning direction;

distance detecting means for detecting a distance which the photoconductive element moves in a period of time corresponding to a subscanning pitch interval; and correcting means for correcting banding due to a variation in speed of the photoconductive element by comparing an output signal of said distance detecting means and a set signal stored beforehand and then deflecting the laser/beam in a subscanning direction by a correction signal which is based on a sum of a difference between said output signal and said set signal, a sum of differences as measured from the beginning of writing and on said detected incident position, said correcting means updating said set signal every time a copy is produced.

2. An apparatus as claimed in claim 1, further comprising a memory for storing said set signal.

3. An apparatus for forming an image by deflecting a laser beam having been modulated by an image signal by a rotary polygonal mirror onto a photoconductive element to electrostatically form a latent image and then developing said latent image, said apparatus comprising:

position detecting means for detecting an incident position where the laser beam is incident to the photoconductive element in both a main scanning direction and a subscanning direction;

distance detecting means for detecting a distance which the photoconductive element moves in a period of time corresponding to a subscanning pitch interval; and correcting means for correcting banding due to a variation in speed of the photoconductive element by comparing an output signal of said distance detecting means and a set signal stored beforehand and then deflecting the laser beam in a subscanning direction based on a correction signal which is a sum of a difference between said output signal and said set signal, a sum of differences as measured from the beginning of writing and on the detected incident position.

4. An apparatus as claimed in claim 3, further comprising a memory for storing said set signal.

5. An apparatus for forming an image by deflecting a laser beam having been modulated by an image signal by a rotary polygonal mirror onto a photoconductive element to electrostatically form a latent image and then developing said latent image, said apparatus comprising:

position detecting means for detecting an incident position where the laser beam is incident to the photoconductive element in both a main scanning direction and a subscanning direction;

distance detecting means for detecting a distance which the photoconductive element moves in a period of time corresponding to a subscanning pitch interval; and correcting means for correcting banding due to a variation in said incident position by comparing an output signal of said position detecting means and a set signal stored beforehand and then deflecting the laser beam in a subscanning direction by a correction signal which is representative of a deviation of said output signal from said set signal, said correcting means updating said set signal every time image data of one color is replaced with image data of another color.

6. An apparatus as claimed in claim 5, further comprising a memory for storing said set signal.

* * * * *